United States Patent Office 2,829,961
Patented Apr. 8, 1958

2,829,961

PRODUCING ALUMINUM

Mike A. Miller, Luther M. Foster, and Cole D. Baker, New Kensington, Pa., assignors to Aluminum Company of America, Pittsburgh, Pa., a corporation of Pennsylvania No Drawing. Application March 14, 1955
Serial No. 494,265

12 Claims. (Cl. 75—68)

This invention relates to the production of aluminum by a thermal reduction process, particularly the reduction of alumina with carbon, or with aluminum carbide.

It has generally been found, in the past, that aluminum in liquid phase is not obtained in processes devised to effect the reduction of alumina with carbon if the reactants are free of other metals or their oxides so that no added alloying element is concurrently produced. Rather, the aluminum-containing product which usually appears in significant amount is aluminum carbide. The reaction may be written:

$$2Al_2O_3 + 9C \rightarrow Al_4C_3 + 6CO \uparrow \qquad (1)$$

in which alumina and carbon react in the proportion by weight of about 65:35. The reaction proceeds favorably at, or better above, about 1800° C. Some investigators, nevertheless, have indicated that they occasionally found small quantities of solid aluminum particles distributed in the cooled product remaining after such a reaction, but apparently none has been able to discover or explain what conditions are necessary to produce and retain aluminum following such a reaction, particularly aluminum in liquid phase.

Probably the only thermal process for the reduction of alumina with carbon that ever reached a commercial stage was the Cowles process for producing aluminum alloys, in which a "collector" metal was added to the alumina-carbon charge in an electric furnace. However, it has not been found economically feasible to remove the "collector" metal from the aluminum alloys produced by that process. In any event, the present day commercial process of producing aluminum, i. e. by electrolysis of alumina in a fused cryolite bath, promptly displaced the Cowles process, despite the theoretical advantages of a thermal reduction process.

An object of the invention is the provision of a thermal process for producing aluminum. Additional objects are the provision of such a process from which aluminum free of an added alloying element may be readily obtained and retained in liquid phase, and the provision of such a process which may be carried on in a semi-continuous or continuous manner, and not merely on a batch basis, to produce substantial quantities of aluminum.

We have found not only that a furnace charge of alumina and carbon may be caused to react in accordance with Equation 1 to produce aluminum carbide, but also that the aluminum carbide may be caused to enter into binary fusion with an excess of alumina, i. e. to form the substantially non-metallic fusion of alumina and aluminum carbide hereinafter more fully described, if the following procedure is employed. The charge is made up to contain alumina and a much smaller but substantial amount of carbon, the proportion by weight of alumina to carbon being greater than about 80:20, and the temperature is raised to at least about 1900° C. Higher temperatures are, of course, more effective. Although alumina alone does not melt below about 2040°

C., such a charge will react and fuse at the lower temperature referred to. A substantially larger amount of carbon in the charge than that just referred to prevents complete fusion from taking place, or at least makes the fusion "mushy" or "sticky," and such a charge is not well suited to the production of aluminum by the process as hereinafter more fully described.

Further, we have found that aluminum is not necessarily produced in the fusion referred to by merely following the procedure so far described. Rather, it is also necessary that the charge contain sufficient carbon so that the proportion by weight of alumina to carbon is less than about 85:15, and that the temperature be raised to at least about 1980° C. A substantially smaller amount of carbon in the charge than that just referred to merely results in the formation of aluminum carbide or a carbide-containing composition, with the reaction of Equation 1 predominating over any aluminum producing reaction. In any event, no aluminum is produced at temperatures substantially below that just stated.

We have discovered that the alumina-carbon charges described, form substantially non-metallic, single phase, liquid fusions of alumina and aluminum carbide in which alumina and aluminum carbide exhibit an affinity for each other in the proportion by weight of about 74:26. Ordinarily no unreacted carbon remains in these fusions, but we have not determined whether all of the aluminum carbide therein may be considered as in solution, nor whether any is actually tied to alumina, in the liquid phase by the mutual affinity referred to. However, by chemical, metallographic and X-ray methods, we have identified in solidified fusions from which aluminum had been produced, an apparently hitherto unrecognized, stable aluminum oxycarbide of the formula $Al_4O_4C$, which may be regarded as formed of alumina and aluminum carbide by the following reaction:

$$4Al_2O_3 + Al_4C_3 \rightarrow 3Al_4O_4C \qquad (2)$$

in which alumina and aluminum carbide combine in the proportion by weight of about 74:26 stated above. This aluminum oxycarbide may exist in the fusion, since alumina and aluminum carbide exhibit a strong affinity for each other therein, in the aluminum oxycarbide proportion stated.

When aluminum carbide is available in the fusion in an amount in excess of that in the aluminum oxycarbide proportion stated, and the fusion is at a temperature of at least about 1980° C., we have found that a further reaction is effected in the fusion to produce aluminum. We can represent such a reaction as follows:

$$Al_4O_4C + Al_4C_3 \rightarrow 8Al + 4CO \uparrow \qquad (3)$$

The over-all aluminum producing reaction may then be considered as involving the three reactions of Equations 1, 2 and 3, thus:

$$12Al_2O_3 + 36C \rightarrow 4Al_2O_3 + 4Al_4C_3 + 24CO \uparrow \qquad (1)$$
$$4Al_2O_3 + 4Al_4C_3 \rightarrow 3Al_4O_4C + 3Al_4C_3 \qquad (2)$$
$$3Al_4O_4C + 3Al_4C_3 \rightarrow 24Al + 12CO \uparrow \qquad (3)$$

which may be simply written:

$$12Al_2O_3 + 36C \rightarrow 24Al + 36CO \uparrow \qquad (1)-(3)$$

or $$Al_2O_3 + 3C \rightarrow 2Al + 3CO \uparrow \qquad (4)$$

which is the theoretical reaction for the thermal reduction of alumina with carbon. However, it is to be noted that Equation 4 represents an alumina to carbon proportion by weight of about 74:26, in which the amount of carbon greatly exceeds the limits hereinabove indicated to be practical for fusion of an initial alumina-carbon charge. Thus, this over-all reaction is not to be considered apart from the operating conditions previously and hereafter discussed.

The process may also be viewed as a simplified one for the reduction of alumina with aluminum carbide. In such case the simplified aluminum producing reaction may be considered as involving merely the over-all reaction of Equations 2, and 3, thus:

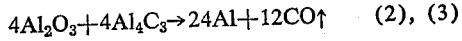

$$4Al_2O_3 + 4Al_4C_3 \rightarrow 24Al + 12CO\uparrow \quad (2), (3)$$

or

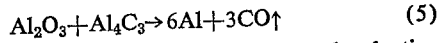

$$Al_2O_3 + Al_4C_3 \rightarrow 6Al + 3CO\uparrow \quad (5)$$

which is the theoretical reaction for the thermal reduction of alumina with aluminum carbide. However, it is to be noted that Equation 5 represents an alumina to aluminum carbide proportion by weight of about 41:59, in which the amount of aluminum carbide appears definitely to exceed the limit of solubility of aluminum carbide in the fusion. Fusions containing so much aluminum carbide remaining undissolved, making the fusion difficult to handle. For that reason we recommend confining the aluminum carbide content of the fusion compositions to an amount up to that in the alumina-aluminum carbide proportion by weight of about 61:39, which is approximately the proportion resulting from reaction and fusion of alumina and carbon in the proportion by weight heretofore referred to of 80:20.

In alumina-aluminum carbide fusions in which aluminum carbide is available in an amount in excess of that in the proportion of alumina to aluminum carbide of about 74:26, and the temperature is at least about 1980° C., we have found, as we have said, that aluminum is produced. Sufficient carbon may be incorporated in the initial charge to introduce the desired excess of aluminum carbide or the desired excess of aluminum carbide may be later provided.

We have also found that aluminum is produced in the fusion in liquid phase, that it rises out of the fusion, along with some aluminum carbide, and also that it is largely retained in liquid phase by being accumulated as a constituent of a metallic, single phase melt of aluminum and aluminum carbide supernatant to the non-metallic fusion. Since the aluminum rises, the underlying fusion remains substantially non-metallic, only the supernatant melt having a truly metallic character. Two substantially immiscible liquid phase layers are formed and may be maintained: the substantially non-metallic fusion and the metallic melt immediately thereabove.

The metallic melt is found to be a homogeneous layer, which we regard as composed of aluminum and aluminum carbide, although it may also be regarded as a mixture or alloy of aluminum and carbon. The aluminum in the presence of aluminum carbide in the melt has a lower activity and lower vapor pressure than does aluminum alone, and is retained therein at temperatures at which aluminum alone would ordinarily be largely volatilized. Thus, the aluminum carbide in the melt acts like a "collector," but with the advantage that it is one that may be readily separated from the aluminum as hereinafter pointed out. The process may be carried out most efficiently up to temperatures of about 2100° C. Substantially above this temperature, however, the aluminum is more and more readily lost as a volatile phase.

Some of the metallic melt may be, from time to time, or continuously, withdrawn from above the fusion, and additional alumina and carbon or aluminum carbide may be supplied to the fusion, so that the process may be operated in a semi-continuous or continuous manner. Since there is aluminum in the metallic melt substantially in excess of that considered to be associated with carbon as aluminum carbide, aluminum may be readily obtained therefrom. A typical melt analyzes, upon solidification, 80 percent by weight aluminum and 20 percent aluminum carbide, for example. A convenient method of separating aluminum from the aluminum carbide is to employ a liquation process, preferably in the presence of a flux. For example, the withdrawn melt may be fluxed with chlorine, or passed through a container under an aluminum chloride atmosphere, and molten aluminum separates from solid aluminum carbide. The withdrawn melt may be cooled to about 700° C., for example, and molten aluminum separated out without solidification of the aluminum, or the melt may be solidified and re-heated for aluminum separation, if desired.

Once the two liquid phase layers of fusion and melt have been established, additional alumina and carbon or aluminum carbide may be provided in the fusion in various ways, and with various alumina and carbon containing make-up materials, to continue the process as more aluminum is produced. As examples, alumina and carbon may be pre-mixed and partially pre-fused and supplied to the fusion, or the alumina and carbon content of a make-up charge may be adjusted to substantially the proportion required without any pre-fusion thereof. Similarly, alumina and aluminum carbide in the required proportions may be simply pre-mixed and added to the fusion, or the latter component may be separately fed in, as a solid charge if desired. Of course, any make-up materials used may be supplied either separately or together. In whatever way the fusion is made, it has a strong tendency to react toward a composition in which the proportion of alumina to aluminum carbide is that found in the aluminum oxycarbide of the formula $Al_4O_4C$. Alumina in excess of the described aluminum oxycarbide composition will first react with added carbon to form more aluminum carbide, but aluminum will not be produced until aluminum carbide is available in excess of the described aluminum oxycarbide composition. Apparently carbon, if added as such, is reacted to aluminum carbide; and aluminum carbide in excess of the described aluminum oxycarbide composition, whether formed in the fusion or added as such, reacts therein to produce aluminum.

Generally recommended and preferred ranges of operating conditions for the process are set out below:

| Operating Condition | General Range | Preferred Range |
| --- | --- | --- |
| Alumina-Carbon Proportion for Fusion. | Between about 85:15 and 80:20 by weight. | Between about 85:15 and 82:18 by weight. |
| or Alumina-Aluminum Carbide Proportion. | Between about 74:26 and 61:39 by weight. | Between about 74:26 and 67:33 by weight. |
| Fusion Temperature | About 1,900° C. and above. | About 1,950 °C. and above. |
| Aluminum Production Temperature. | Between about 1,980 and 2,100° C. | Between about 2,000 and 2,050° C. |

Since some aluminum values are carried off as a volatile phase with carbon monoxide and other volatile products, it may be advantageous to confine the aluminum producing operation as far as possible to the over-all reaction of Equation 5 above, i. e. to supply alumina and aluminum carbide to the fusion rather than alumina and carbon. If this is done, the carbon monoxide given off while producing aluminum is only one-third of the amount that would be given off in producing the same amount of aluminum by the over-all reaction of Equation 4. The aluminum carbide used may include that separated from the withdrawn melt, thus returning that material to the process; and aluminum carbide may also be made separately, e. g. it may be preliminarily produced from alumina and carbon as a separate step, without as great a tendency toward loss of aluminum values. Further, we have found that much of the aluminum values that do pass off as a volatile phase may be entrapped or retained in a filter, such as a bed of alumina or carbon or aluminum carbide or mixtures thereof, which may be arranged as a furnace cover over the fusion and melt. Such materials, with entrapped volatile products, may economically be used as make-up materials for the fusion when desired.

The process may conveniently be carried out in ordinary arc furnaces or induction heated furnaces. The most satisfactory furnace lining materials are carbon or alumina refractories, which, if gradually attacked somewhat by the fusion, introduce no undesired materials into the fusion. The carbon monoxide pressure may conveniently be maintained at or near atmospheric pressure; and we have observed that a slight excess of pressure in the furnace has the desirable effect of excluding air.

The process has been performed in an arc furnace, using primarily the preferred range of operating conditions outlined above, but extending at times throughout the general range outlined above. In the arc furnace, graphite electrodes and a carbon brick and tamped coke-pitch lining were found most satisfactory. A hole was provided at the desired level for tapping out some of the metallic melt from time to time. Additional raw materials were charged periodically through the top of the furnace, down through the melt, into the fusion. Either of two types of charge was generally used. One consisted of alumina briquetted with pitch-coke plus unbriquetted alumina, and the other consisted of lump wood-charcoal and alumina. At times, alumina and aluminum carbide were also introduced. Charge additions were made as required to produce aluminum, while maintaining a liquid fusion. Operations were maintained on a 24 hour basis for a number of days, with the over-all added charge composition closely approximating that theoretically required for producing aluminum as described herein. Aluminum of better than commercial purity was obtained by liquation from the metallic melt withdrawn from the furnace, the minor impurities found being only those attributable to impurities in the charge materials used.

We claim:

1. A process for producing aluminum comprising forming a substantially non-metallic fusion of alumina and aluminum carbide, which exhibit therein an affinity for each other in the proportion by weight of about 74:26 found in aluminum oxycarbide of the formula $Al_4O_4C$, making aluminum carbide available in the fusion in an amount in excess of that in the proportion stated and less than that required for the reduction of all of the alumina with aluminum carbide, effecting a reaction in the fusion, at a temperature of at least about 1980° C., to produce aluminum in liquid phase, and accumulating liquid phase aluminum so produced as a constituent of a metallic melt of aluminum and aluminum carbide rising out of and lying supernatant to the fusion.

2. A process for producing aluminum comprising forming a substantially non-metallic fusion of alumina and aluminum carbide, which exhibit therein an affinity for each other in the proportion by weight of about 74:26 found in aluminum oxycarbide of the formula $Al_4O_4C$, making aluminum carbide available in the fusion in an amount in excess of that in the proportion stated and less than that required for the reduction of all of the alumina with aluminum carbide, effecting a reaction in the fusion, at a temperature between about 1980 and 2100° C., to produce aluminum in liquid phase, accumulating liquid phase aluminum so produced as a constituent of a metallic melt of aluminum and aluminum carbide rising out of and lying supernatant to the fusion, withdrawing some of the melt from above the fusion, and providing additional alumina and aluminum carbide in the fusion, whereby the process is continued.

3. A process according to claim 2 in which aluminum free of aluminum carbide is obtained, further comprising separating molten aluminum from the withdrawn melt by liquation.

4. A process according to claim 2, in which aluminum free of aluminum carbide is obtained, further comprising cooling the withdrawn melt and separating molten aluminum therefrom by liquation in the presence of a flux.

5. A process according to claim 2, in which additional alumina and aluminum carbide are pre-mixed and supplied to the fusion in substantially the proportion required to maintain the production of aluminum.

6. A process according to claim 2, in which additional alumina is fed into the fusion separately from aluminum carbide, and the latter is fed in as a solid charge, to maintain the production of aluminum.

7. A process according to claim 2, in which additional alumina and aluminum carbide are provided by alumina and carbon supplied to the fusion in substantially the proportion required to maintain the production of aluminum.

8. A process according to claim 2, in which additional alumina and aluminum carbide are provided by alumina and carbon which are pre-mixed, partially pre-fused and supplied to the fusion in substantially the proportion required to maintain the production of aluminum.

9. A process for producing aluminum comprising forming a substantially non-metallic fusion of alumina and aluminum carbide, which exhibit therein an affinity for each other in the proportion by weight of about 74:26 found in aluminum oxycarbide of the formula $Al_4O_4C$, making aluminum carbide available in the fusion in an amount in excess of that in the proportion stated and up to that in the proportion of about 61:39, effecting a reaction in the fusion, at a temperature between about 1980 and 2100° C., to produce aluminum in liquid phase, accumulating liquid phase aluminum so produced as a constituent of a metallic melt of aluminum and aluminum carbide rising out of and lying supernatant to the fusion, withdrawing some of the melt from above the fusion, and providing additional alumina and aluminum carbide in the fusion, whereby the process is continued.

10. A process for producing aluminum comprising forming a substantially non-metallic fusion of alumina and aluminum carbide, which exhibit therein an affinity for each other in the proportion by weight of about 74:26 found in aluminum oxycarbide of the formula $Al_4O_4C$, making aluminum carbide available in the fusion in an amount in excess of that in the proportion stated and up to that in the proportion of about 67:33, effecting a reaction in the fusion, at a temperature between about 2000 and 2050° C., to produce aluminum in liquid phase, accumulating liquid phase aluminum so produced as a constituent of a metallic melt of aluminum and aluminum carbide rising out of and lying supernatant to the fusion, withdrawing some of the melt from above the fusion, and providing additional alumina and aluminum carbide in the fusion, whereby the process is continued.

11. A process for producing aluminum comprising reacting and fusing a mixture of alumina and carbon in a proportion by weight less than about 85:15 and greater than about 80:20, at a temperature of at least about 1900° C., to form a substantially non-metallic fusion of alumina and aluminum carbide which exhibit therein an affinity for each other in the proportion by weight of about 74:26 found in aluminum oxycarbide of the formula $Al_4O_4C$, thereby making aluminum carbide available in the fusion in an amount in excess of that in the proportion stated, effecting a further reaction in the fusion, at a temperature between about 1980 and 2100° C., to produce aluminum in liquid phase, accumulating liquid phase aluminum so produced as a constituent of a metallic melt of aluminum and aluminum carbide rising out of and lying supernatant to the fusion, withdrawing some of the melt from above the fusion, and supplying additional alumina and carbon to the fusion, whereby the process is continued.

12. A process for producing aluminum comprising reacting and fusing a mixture of alumina and carbon in a proportion by weight less than about 85:15 and greater than about 82:18, at a temperature of at least about 1950° C., to form a substantially non-metallic fusion of alumina and aluminum carbide, which exhibit therein an affinity for each other in the proportion by weight of about 74:26 found in aluminum oxycarbide of the formula $Al_4O_4C$, thereby making aluminum carbide available in the fusion in an amount in excess of that in the proportion stated and up to that in the proportion of about 67:33, effecting a further reaction in the fusion, at a temperature between about 2000 and 2050° C., to produce aluminum in liquid phase, accumulating liquid phase aluminum so produced as a constituent of a metallic melt of aluminum and aluminum carbide rising out of and lying supernatant to the fusion, withdrawing some of the melt from above the fusion, and supply additional alumina and carbon to the fusion, whereby the process is continued.

References Cited in the file of this patent

UNITED STATES PATENTS

| | | |
|---|---|---|
| 675,190 | Blackmore | May 28, 1901 |
| 1,220,843 | Hershman | Mar. 27, 1917 |
| 2,776,884 | Grunert | Jan. 8, 1957 |